United States Patent [19]
Barabas et al.

[11] 4,169,924
[45] Oct. 2, 1979

[54] PREPARATION OF LINEAR CYCLIC POLYIMIDES FROM LATICES

[75] Inventors: Eugene S. Barabas, Watchung; Andrew Klein, Somerville, both of N.J.

[73] Assignee: GAF Corporation, New York, N.Y.

[21] Appl. No.: 805,001

[22] Filed: Jun. 9, 1977

[51] Int. Cl.² .............................................. C08F 8/32
[52] U.S. Cl. ........................................ 525/377; 260/8;
     260/17 R; 260/17.4 CL; 260/29.6 RW;
     260/29.6 H; 260/29.6 WB; 260/29.6 HN;
     525/329; 525/378; 525/379
[58] Field of Search .............. 260/78 UA; 526/16, 51;
     260/29.6 H, 29.6 HN

[56] References Cited
U.S. PATENT DOCUMENTS

| 3,441,545 | 4/1969 | Blatz et al. | 526/16 |
| 3,634,372 | 1/1972 | McFadden | 526/16 |
| 3,647,731 | 3/1972 | Clough | 526/16 |
| 3,753,965 | 8/1973 | Looney et al. | 526/16 |
| 3,776,976 | 12/1973 | Volker et al. | 260/78 UA |
| 3,850,898 | 11/1974 | Ide et al. | 526/16 |
| 3,897,404 | 7/1975 | Korte et al. | 526/16 |

Primary Examiner—Harold D. Anderson
Attorney, Agent, or Firm—Walter C. Kehm; Joshua J. Ward

[57] ABSTRACT

Linear cyclic polyimides are prepared by reacting a latex prepolymer with ammonia, an organic primary amine, hydroxylamine or a mixture thereof, at a temperature between 50° C. and 300° C. The prepolymer contains reactive functional groups, such as carboxyl, amide, alkyl ester and nitrile. The linear cyclic polyimides are thermoplastic materials.

10 Claims, No Drawings

PREPARATION OF LINEAR CYCLIC POLYIMIDES FROM LATICES

BACKGROUND OF THE INVENTION

This invention relates to the preparation of high molecular weight linear cyclic polyimides, which are thermoplastic substances. The term "thermoplastic" describes synthetic polymeric materials which are capable of being repeatedly softened when heated and hardened when cooled. Cyclic polyimides are known substances, having been described, inter alia, in U.S. Pat. No. 3,539,537 and in an article by Bower and Frost in J. Polymer Sci (A) 1, 3135 (1963). The methods described for preparing these polymers involve the preparation of prepolymers made from difficult to handle monomers (pyromellitic acid, dimethyl benzidine, etc.) in high boiling solvents (N-methyl pyrrolidone, tetramethylene sulfone, etc.). Generally, these methods yield cyclic polyimides of relatively low molecular weight. High molecular weight polymers can be obtained by this method only when using very pure monomers and by rigorous exclusion of moisture.

Another method of preparing a thermoplastic cyclic imide employs a solution copolymer of methacrylic acid and methacrylonitrile. In order to permit cyclization to the imide, the copolymer must have alternating units. There are various disadvantages to this currently used process. First, it is a solvent based process, thereby raising safety and environmental problems. The viscosity of the solution polymer is high and inconvenient to work with. As already noted, the unit sequence in the prepolymer is important since cyclization can take place only between a methacrylic acid unit and a methacrylonitrile unit. Moreover, if there are three or more consecutive nitrile units in the acid nitrile polymer chain, the condensation stops short, having one or more uncyclized nitrile units in the chain.

Accordingly, it is an object of this invention to provide an improved process for preparing linear cyclic polyimides of high molecular weight.

It is another object of this invention to provide a method for preparing polymeric cyclic imides which employs a water base emulsion system.

Yet another object is to prepare polymeric cyclic imides from a wide variety of prepolymers, particularly from copolymers in which there is no critical unit sequence.

And yet another object of this invention is to provide a wider variety of polymeric cyclic imide products than is currently available. Other objects and advantages of this invention will become apparent from the following discussion.

SUMMARY OF THE INVENTION

Linear cyclic polyimides having the repeating unit:

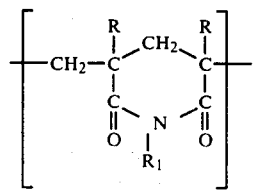

wherein R is hydrogen or lower alkyl and $R_1$ is hydrogen or an organic radical, are prepared by reacting a suitable latex prepolymer with ammonia, an organic primary amine or hydroxylamine at a temperature from about 50° C. to about 300° C. The latex prepolymer contains reactive functional groups such as carboxyl, amide, alkyl ester and nitrile.

DETAILED DISCLOSURE

In the repeating units of the linear cyclic polyimides obtained in accordance with the present invention, R represents hydrogen or a lower alkyl radical having from 1 to 4 carbon atoms, such as methyl, ethyl, n-propyl, isopropyl, n-butyl and the like. Preferably, R is hydrogen, methyl or ethyl. $R_1$, which can vary from unit to unit, represents hydrogen or a wide variety of inert organic radicals. By "inert" is meant radicals which do not render the product unstable and which do not react with any of the process reactants or solvents. Typical organic radicals are alkyl groups, aryl groups, aralkyl groups, cycloalkyl groups, heterocyclic groups, all of which may be unsubstituted or substituted by various substituents such as halogens. Typical organic radicals encompassed within the meaning of $R_1$ are alkyl groups having from 1 to 18 carbon atoms, particularly lower alkyl groups of from 1 to 4 carbon atoms, such as methyl or ethyl; phenyl which may be unsubstituted or substituted by one or more halogen atoms or lower alkyl groups; benzyl which may be unsubstituted or substituted in the ring by one or more halogen or lower alkyl groups; cyclopentyl or cyclohexyl, radicals of condensed rings, such as naphthyl or acenaphthyl; radicals of heterocycles such as pyridyl, chinolyl, pyrrolidonyl, tetrahydrofuryl, and the like.

The latex prepolymers employed in the present invention contain functional groups which are capable of reacting with ammonia, an organic primary amine or hydroxylamine. These functional groups are typically carboxyl, amide, alkyl ester and nitrile. A typical, and preferred prepolymer has the partial structure

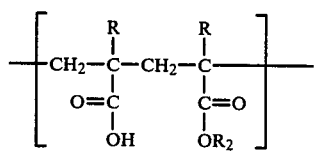

wherein $R_2$ is alkyl of from 1 to 8 carbon atoms, preferably alkyl of from 1 to 4 carbon atoms. Copolymers having this partial structure are prepared by polymerizing an $\alpha,\beta$-monoethylenically unsaturated carboxylic acid and a lower alkyl ester of the same or a different $\alpha,\beta$-monoethylenically unsaturated carboxylic acid. The above formula indicates that the acid and ester units alternate; however, it is not required in the practice of this invention that there be alternating units. Suitable reaction sites occur if there are two or more adjacent acid units or if there are two or more adjacent ester units. This "copolymer" can include reactive or unreactive termonomers. Likewise, this latex prepolymer can be, for example, a homopolymer of an $\alpha,\beta$-monoethylenically unsaturated carboxylic acid or a homopolymer of an ester of said $\alpha,\beta$-monoethylenically unsaturated carboxylic acid. Furthermore, the acid and/or the ester units in the copolymer can be derived from different acid and ester-containing monomers.

In addition to the possibility of the above described latex prepolymers containing reactive termonomer units, they can also contain small amounts of some polyfunctional, ethylenically unsaturated cross-linking monomers.

These polyfunctional monomers have to be capable of polymerizing under free radical conditions to covalently bond different chains of the polymer. Polyfunctional monomers, such as divinyl benzene, polyethyleneglycoldimethacrylate, methylene-bis-acrylamide, etc., may serve as examples. Other monomers, which can render the polymer curable through heat-treatment or otherwise cross-linkable, such as methylolacrylamide, glycidylmethacrylate, epoxybutadiene, etc., may also be used as comonomers. By introducing such cross-linking into the prepolymer, the final cyclic polyimide can have enhanced or altered properties.

A preferred latex prepolymer suitable for use in the process of the present invention contains the following monomer units:

(1) From about 5% to about 70%, preferably from 40% to 60%, by weight, of an $\alpha,\beta$-monoethylenically unsaturated carboxylic acid, preferably methacrylic acid, ethacrylic acid or mixtures thereof with other unsaturated carboxylic acids such as acrylic acid. The amount of such other unsaturated carboxylic acids which can be employed in such mixtures can vary up to about 50% or more of such mixtures depending upon the concentration and hydrophobic nature of the carboxylic acid ester units in the resulting polymer. As the concentration and/or hydrophobic nature of the ester increases, increasing amounts of such other unsaturated carboxylic acids, e.g. acrylic acid, can be employed to the extent that a stable latex can still be obtained.

(2) From about 5% to about 85%, preferably from 40% to 60%, by weight, of at least one alkyl ester of an $\alpha,\beta$-unsaturated carboxylic acid, a predominant portion of said ester having from 1 to 4 carbon atoms in the alkyl moiety. Preferably, the acid is acrylic or methacrylic acid.

(3) From about 0 percent to about 20 percent, preferably from about 0 percent to 8 percent, by weight, of an ethylenically unsaturated organic termonomer represented by the formula:

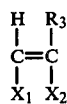

wherein $R_3$ is hydrogen, methyl, ethyl or halogen such as chlorine, bromine, iodine or fluorine, $X_1$ is hydrogen or $C_1$-$C_{18}$ alkoxycarbonyl, and $X_2$ is a member selected from the group consisting of aryl, aminocarbonyl, cyano, $C_1$-$C_4$ alkoxy, carboxy, $C_1$-$C_{18}$ alkoxycarbonyl, halo, acyl, aldehyde, keto, isocyanato, $C_3$-$C_9$ heterocyclic, $C_1$-$C_4$ alkylene, halomethylene, acetomethylene, sulfo, $C_1$-$C_4$ alkoxysilane and hydrogen.

Illustrative of such termonomers are styrene, vinyltoluene, chlorostyrene, acrylamide, methacrylamide, N-isopropyl acrylamide, acrylonitrile, methacrylonitrile, methylvinyl ether, ethylvinylether, butyl vinyl ether, halfacid ethylmaleate, halfacid 2-ethylhexyl maleate, halfacid ethylfumarate, halfacid ethylitaconate, diethylmaleate, dibutyl maleate, diethyl fumarate, vinylchloride, vinylidene chloride, vinylbromide, vinylidene fluoride, vinylacetate, vinylpropionate, vinylchloroacetate, vinylbenzoate, vinylthioacetate, acrolein, methacrolein, methylvinyl ketone, ethylvinylketone, isopropenyl methyl ketone, vinyl isocyanate, isopropenyl isocyanate, vinyl isothicyanate, N-vinyl-2-pyrrolidone, N-vinyl-2-oxazolidinone, vinylfurane, indene, 2,3-dihydrofurane, vinyl succinimide, butadiene, isoprene, chloroprene, allyl chloride, allyl acetate, allyllaurate, methallylchloride, vinyl sulfonic acid, sodium vinyl sulfonate, vinyltriethoxysilane, vinyl triisopropoxysilane, ethylene, propylene, and the like.

The preparation of the prepolymers is carried out in an emulsion system. The term "emulsion" as used herein, is intended to mean a true colloidal dispersion of the prepolymer in water. As is well known, emulsion polymerization techniques result in the obtainment of higher molecular weight polymers than by polymerization by other techniques such as solution polymerization.

Polymerization is effected in the presence of a catalyst or initiator, preferably one which serves as a thermally activated source of free radicals. Among such catalysts may be mentioned peracetic acid, hydrogn peroxide, persulfates, perphosphates, perborates, percarbonates, etc. The preferred catalyst is ammonium persulfate, which provides efficient reaction rates and contains a fugitive cation. The amount of initiator used is normally about 0.03 to 3.0%, by weight based on the weight of the total monomers and preferably from 0.25 to 0.5%. Preferably, the initiator is a redox combination of the water soluble persulfate as the oxidizing component and a hydrosulfite, e.g. sodium hydrosulfite as the reducing component of the redox combination. Water soluble bisulfites, metabisulfites, or thiosulfates, reducing sugars, formaldehyde sulfoxilate, etc., may be used in lieu of the hydrosulfites. Other typical redox combinations, such as sodium azide and ceric ammonium sulfate, titanium trichloride and hydroxylamine, and the like, may also be used. Generally useful proportions of the indicated persulfate-hydrosulfite system and 0.1% to 1.0% for the oxidizing component and 0.015 to 1.5% for the reducing component based on the amount of monomers.

The redox combination can be further activated by the presence of polyvalent metal ions at the lower oxidation state, e.g. ferrous sulfate, cuprous sulfate and the like. The preferred amount of these metal salts may be between 5 ppm and 100 ppm by weight based on the total amount of the monomers.

The aqueous medium for polymerization contains some emulsifiers to help to disperse the monomers in the aqueous medium and to protect the particles formed. Anionic surfactants such as the salts of the higher molecular weight sulfonic acids, e.g. alkyl aryl sodium sulfonates, are eminently suitable for the purpose, though other anionic surfactants can also be used with good results. The amount of surfactant employed can be varied considerably, but ordinarily ranges from about 0.1% to about 10% and more preferably, ranges from about 0.2% to about 1.0%, by weight, based on the total weight of the comonomers employed.

The reaction mixture can also contain a small amount of a lower aliphatic alcohol which is believed to act as a solubilizer for the water insoluble monomers. Methanol, ethanol, n-butanol, and the like, may serve as examples.

The emulsion can also contain a small amount of a protective colloid, such as water soluble cellulose derivatives, poly(vinylpyrrolidone), alkali metal polyacrylates, water soluble aliginates, and the like. The amount of such a colloid used can range, for example, from about 0.1% to about 2% and more particularly from about 0.5% to 1%.

The emulsions typically have from about 15% and preferably from about 20% to about 50% solids content. The average particle size of the latex may be from about 500 Ångstroms or smaller to about 3000 Ångstroms or greater.

The reaction temperature applied depends, in the first place, on the polymerization catalyst and the monomers used. In general, the polymerization is carried out at a temperature in the range of from 5° C. to 120° C. When the catalyst is a redox system, the recommended initial temperature range is 5° C. to 90° C., advantageously 15° C. to 75° C.

It is advisable to operate with the exclusion of oxygen, for example, under an inert gas such as nitrogen, argon and the like. Sometimes, it may also be advantageous to run the reaction under elevated or reduced pressure.

The polymerization can be run conveniently by a single stage procedure, when all the ingredients are charged to the reactor at the same time. Since the polymerization reaction is exothermic, the initiation thereof can be evidenced by the increasing temperature. When the polymerization has proceeded to the extent that the consumption of the monomers is practically complete, the terminal point is indicated by the cessation in the rise of the temperature, followed by temperature drop. The time period necessary for the aforedescribed operation can range from about 10 minutes to about 2 hours.

While this method offers a simple and satisfactory means for the preparation of these particular latex prepolymers, any other method suitable for the preparation of oil-in-water emulsion polymers can also be used with good results. Thus, for example, emulsion interpenetrating network polymerization—which is a direct extension of conventional emulsion polymerization—can also be used for the preparation of the polyimides of this invention.

The latex prepolymers useful in the process of this invention can contain various functional groups, such as carboxyl, amide, alkyl ester and nitrile. Where the functional groups are carbonyl and alkyl ester, the polymers may employ any relative amount of 1 or more of these functional groups. In addition, homopolymers may be used when the functional groups are carboxyl, amide or alkyl ester. However, when one of the functional groups is a nitrile, it must be used in a copolymer or terpolymer containing a carboxylic acid substituent. Furthermore, it is preferred that the carboxylic acid and the nitrile be used in stoichiometric ratio.

The reaction of this process consists of two parts, the first part may be called "amination". In the course of this step, an intermediate structure is formed, the chemical character of which depends upon the ingredients of the latex polymer starting material. If, for instance, a copolymer latex consists of ester and acid units and the nitrogen-containing reactant is ammonia, the "aminated" intermediate is the ammonium salt of a half amide of the resulting diacid segment.

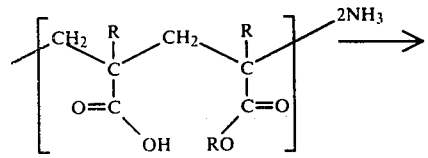

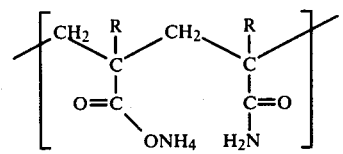

This equation is only illustrative since different intermediate products may also be formed by reacting with ammonia or amines, depending upon the chemical character of the substituents of the precursor latex polymer.

The second part of the reaction step may be called "cyclization". In this part, a cyclic structure is formed through the separation of some small molecules, the chemical nature of which depends upon the type of the substituents of the starting material copolymer. Continuing the foregoing example:

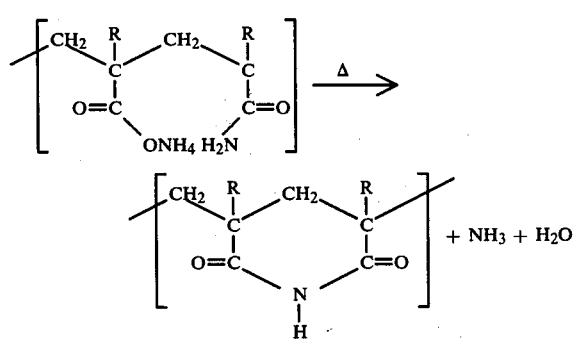

The first and second part of the reaction may be carried out in a single operation. According to the present invention, the latex polymer is submitted to conditions which favor reaction between the functional groups of the polymer with ammonia and amines. At the same time, these reaction conditions cause the complete separation of the aforesaid small molecules from the polymer structure.

This reaction may be carried out by simply adding the ammonia or amine to the latex polymer, then by increasing the temperature to the level desired. This temperature may be from 50° C. to 300° C. and preferably from 100° C. to 240° C. Since at higher temperatures considerable pressure may develop, the reaction is conveniently carried out in an autoclave, which may be of stainless steel or glass lined.

The following examples are illustrative and are not to be construed as limiting the scope of this invention.

EXAMPLE I

Preparation of a Latex Precursor

Apparatus: 5 liter kettle, equipped with mechanical stirrer, reflux condenser, gas inlet tube and thermometer.

Charge:
1. 2993.7 g distilled water,
2. 15.3 L g Siponate DS-10 (sodium alkylaryl sulfonate—25%, available from Alcolac Co.)
3. 394.2 g methacrylic acid
4. 458.3 g methyl methacrylate
5. 3.40 g ammonium persulfate (10%)
6. 5.67 g ferrous sulfate (0.1%)
7. 4.23 g sodium hydrosulfite (Lykopon—10%, available from Rohm & Hass Co.)

Procedure: The apparatus was thoroughly purged with nitrogen then ingredients 1 through 4 were introduced under a blanket of inert gas. After that, the initiator system (ingredients 5, 6 and 7) were added in this order. The temperature was raised to 30° C., then the reaction was allowed to proceed, until the temperature reached peak at 60° C. After that, the latex was cooled to room temperature, and was discharged through a 100 mesh screen.

Analysis: Solids: 23.25%; Coagulum: Trace; Mechanical Stability: Good; Brookfield Viscosity: 15 cps.

EXAMPLE II

Preparation of Product

Apparatus: 1 gallon stainless steel autoclave, equipped with agitator, gas inlet tube, pressure guage and temperature recording device.

Charge:
1. 2155 g emulsion polymer of Example I
2. 308 g conc. ammonium hydroxide
3. 230 g distilled water Procedure: The ingredients were charged and the autoclave was sealed. Agitation was started, and the temperature was raised to 230° C. slowly. During this time, the pressure increased to 100 psi. The temperature was maintained for 7 hours. After that, the system was cooled to room temperature and the final product was removed from the autoclave.

Analysis: Nitrogen found: 9.2% Theory: 8.5%.

| Structural Analysis (by IR): | |
|---|---|
| Peak (type)* | Assignment |
| 3.08 S | N—H (imide) |
| 5.94 S | C=O |
| 12.30 M | N—H bending |

*S = Strong, M = Medium (Lack of CO-stretching band at 8.6μ indicated absence of free ester and lack of band at 6.0μ showed absence of $CONH_2$ groups).

Physical Testing:
Impact Strength (notched): 0.46
Impact Strength (unnotched): 2.02
Flex Modulus ($\times 10^3$): 759
Flex Strength: 17.701
Hardness (M Scale): 106.8
Softening Point: 325° C.

EXAMPLE III

Preparation of Product

Apparatus: 1 gallon stainless steel autoclave equipped as described in Example II.

Charge:
1. 1718.0 g emulsion polymer of Example I
2. 409.5 g n-butylamine
3. 638.0 g distilled water Procedure: The ingredients were charged and the autoclave was sealed. Vigorous agitation was started, and the temperature was raised to 23° C. over a 2 hour period. During this time, the pressure increased to 540 psi. The temperature was maintained for 7 hours. After that the system was cooled to room temperature and the polymer, separated from the water medium, was removed from the autoclave.

Structural Analysis (by IR):
Peak Type*
5.82–6.05 (S) dublet of substituted imide
11.30 (M) butyl group Furthermore, lack of N—H stress peak at 3.05μ, indicated the presence of only substituted imide groups.
*S=Strong, M=Medium Nitrogen found=7.5% Theory: 7.2%.
Physical Testing:
Impact Strength (notched): 0.67
Impact Strength (unnotched): 0.99
Flex Modulus ($\times 10^3$): 272.4
Flex Strength: 5.471
Softening Point: 125° C.

The linear cyclic imide polymers produced by Examples II and III form an exceedingly strong tough mass. They are opaque at room temperature, but become transparent on heating. The temperature of this phase change depends upon the molecular weight of the polymer and on the chemical nature of the substituent of the imide. The polymers can be compression molded into tough, but pliable transparent films, sheet or plates.

These polymers can be made into thermoplastic foams which have excellent heat and chemical resistance, high mechanical strength combined with low weight. They find use in the building, automobile, aircraft and sporting goods manufacturing industries.

What is claimed is:

1. A process for preparing a thermoplastic linear cyclic polyimide having a repeating unit

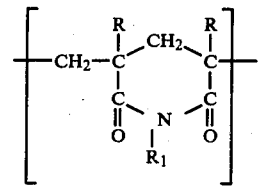

wherein R is hydrogen or lower alkyl and $R_1$ is hydrogen or an organic radical, which comprises adding to latex prepolymer having functional groups selected from the group consisting of carboxyl, amide, alkyl ester and nitrile a nitrogen-containing compound selected from the group consisting of ammonia, a primary amine and hydroxylamine or a mixture thereof, at a temperature of between about 50° C. and 300° C., with the proviso that nitrile functional groups in the latex prepolymer must be employed in a copolymer or terpolymer containing carboxyl groups.

2. A process according to claim 1 wherein the prepolymer is a copolymer of an α,β-unsaturated acid and an alkyl ester of an α,β-unsaturated acid having the repeating units:

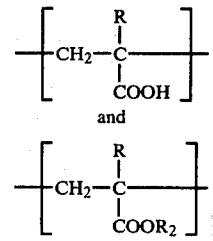

wherein R is hydrogen or lower alkyl and $R_2$ is alkyl of from 1 to 8 carbon atoms.

3. A process according to claim 2 in which the repeating units are:

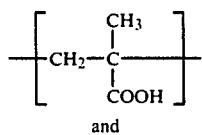

and

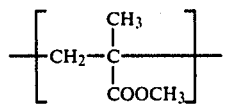

4. A process according to claim 1 in which the reaction temperature is between 100° C. and 240° C.

5. A process according to claim 1 wherein the prepolymer is a terpolymer having the repeating units:

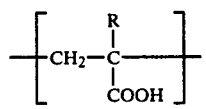 (1)

in an amount ranging from 5 to 70% by weight of the prepolymer,

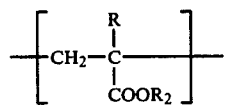 (2)

in an amount ranging from 5 to 85% by weight of the prepolymer, and

 (3)

in an amount ranging from 0.5 to 20% by weight of the prepolymer, wherein R is hydrogen or lower alkyl, $R_2$ is alkyl of from 1 to 8 carbon atoms, $R_3$ is hydrogen, methyl, ethyl or halogen, $X_1$ is hydrogen or $C_1$-$C_{18}$ alkoxycarbonyl and $X_2$ is a member selected from the group consisting of aryl, aminocarbonyl, cyano, $C_1$-$C_4$ alkoxy, carboxy, $C_1$-$C_{18}$ alkoxycarbonyl, halo, acyl, aldehyde, keto, isocyanato, $C_3$-$C_9$ heterocyclic, $C_1$-$C_4$ alkylene, halomethylene, acetomethylene, sulfo, $C_1$-$C_4$ alkoxysilane and hydrogen.

6. A process according to claim 5 wherein repeating unit (1) is present in the terpolymer in an amount ranging from 40 to 60% by weight; repeating unit (2) is present in an amount of from 40 to 60% by weight and repeating unit (3) is present in an amount of to 8% by weight.

7. A process according to claim 1 carried out at about 230° C.

8. A process according to claim 2 carried out at about 230° C.

9. A process according to claim 3 carried out at about 230° C.

10. A process according to claim 5 carried out at about 230° C.

* * * * *